United States Patent
Herndon et al.

(10) Patent No.: US 6,857,189 B2
(45) Date of Patent: Feb. 22, 2005

(54) METHOD AND APPARATUS FOR ASSEMBLING A HYDRODYNAMIC BEARING

(75) Inventors: Troy Michael Herndon, San Jose, CA (US); Norbert Steven Parsoneault, Scotts Valley, CA (US); Alex Gredinberg, San Jose, CA (US); Michael David Kennedy, Boulder Creek, CA (US); Kris Jearakul, Santa Cruz, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 156 days.

(21) Appl. No.: 10/245,926

(22) Filed: Sep. 18, 2002

(65) Prior Publication Data

US 2003/0182800 A1 Oct. 2, 2003

Related U.S. Application Data

(60) Provisional application No. 60/368,488, filed on Mar. 29, 2002.

(51) Int. Cl.$^7$ ............................................... B21D 53/10
(52) U.S. Cl. ................................ 29/898.02; 29/898.07; 29/898.09; 29/407.01; 29/407.03; 29/724
(58) Field of Search ..................... 29/898.02, 898.07, 29/898.09, 407.01, 407.05, 724, 725; 384/100, 107

(56) References Cited

U.S. PATENT DOCUMENTS

| | | | |
|---|---|---|---|
| 3,918,092 A | | 11/1975 | Rueger |
| 3,974,017 A | | 8/1976 | Tanigawa et al. |
| 6,119,348 A | * | 9/2000 | Jennings et al. ......... 29/898.09 |
| 6,246,136 B1 | * | 6/2001 | Ichiyama ..................... 310/90 |
| 6,502,992 B2 | * | 1/2003 | Nakazeki et al. ........... 384/110 |
| 6,530,143 B1 | * | 3/2003 | Jennings et al. ............. 29/721 |
| 6,657,339 B2 | * | 12/2003 | Herndon et al. .............. 310/90 |
| 6,702,465 B2 | * | 3/2004 | Grantz et al. ............... 384/110 |

* cited by examiner

Primary Examiner—Eric Compton
(74) Attorney, Agent, or Firm—Morrison & Foerster LLP

(57) ABSTRACT

A method and apparatus for assembling a hydrodynamic bearing in a motor is provided. The method comprises affixing a first bearing upon a shaft, applying an axial tension force to the shaft, and affixing a second bearing upon the shaft in a spaced apart relation to the first bearing, as the axial force is applied to the shaft.

16 Claims, 6 Drawing Sheets

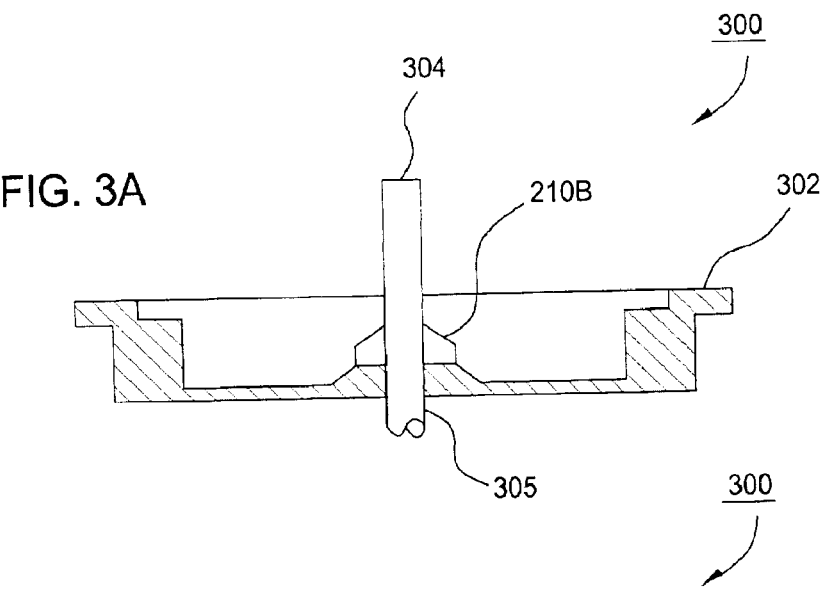
FIG. 3A
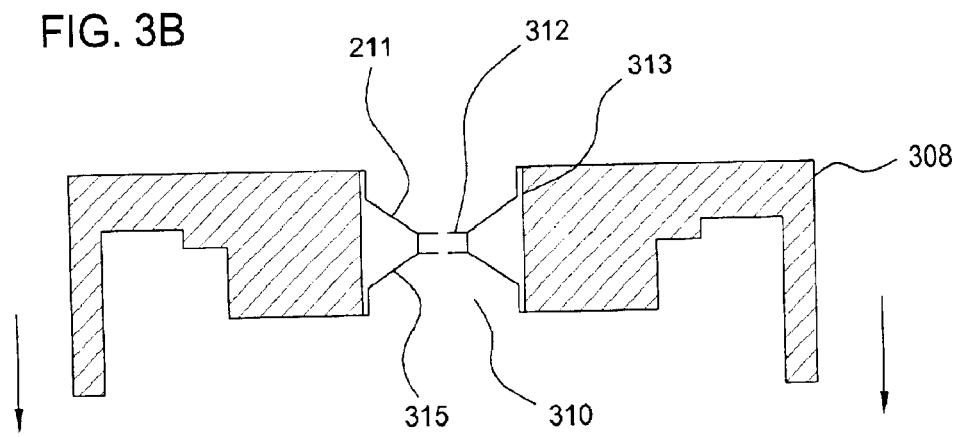
FIG. 3B
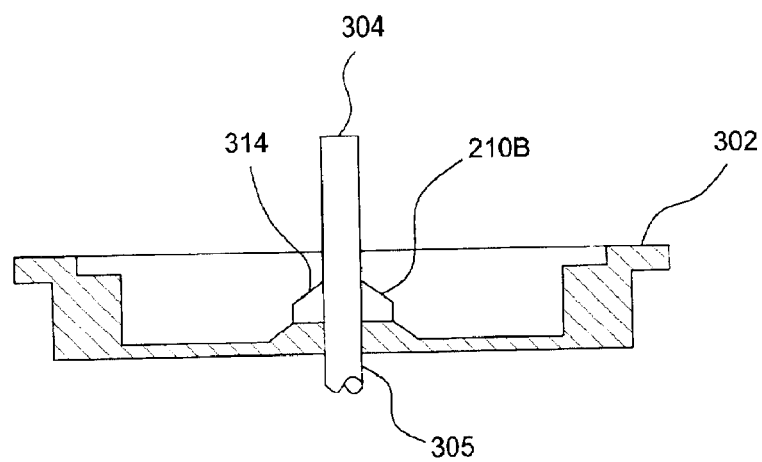

METHOD AND APPARATUS FOR ASSEMBLING A HYDRODYNAMIC BEARING

CROSS REFERENCE TO RELATED APPLICATIONS

This application claims the priority of U.S. Provisional Application No. 60/368,488, filed Mar. 29, 2002 (entitled "Improved Gap Setting Tool Design"), which is herein incorporated by reference.

FIELD OF THE INVENTION

The invention relates to the field of hydrodynamic bearings in electric motors. More specifically, the invention relates to a method for setting a gaps in a hydrodynamic bearing of an electric motor.

BACKGROUND OF THE INVENTION

Disk drive memory systems have been used in computers for many years for storage of digital information. Information is recorded on concentric memory tracks of a magnetic disk medium, the actual information being stored in the form of magnetic transitions within the medium. The disks themselves are rotatably mounted on a spindle. The information is accessed by using read/write heads generally located on a pivoting arm that moves radially over the surface of the disk. The read/write heads or transducers must be accurately aligned with the storage tracks on the disk to ensure proper reading and writing of information.

During operation, the disks are rotated at very high speeds within an enclosed housing using an electric motor that is generally located inside a hub that supports the disks. One type of motor in common use is known as an in-hub or in-spindle motor. Such in-spindle motors typically have a spindle using two ball or hydrodynamic bearings mounted to a motor shaft disposed in the center of the hub.

In a hydrodynamic bearing, a bearing has two spaced-apart surfaces, mounted respectively on two relatively rotating members (typically a shaft and a surrounding sleeve), with a lubricating fluid such as air, gas or oil providing a bearing between them. In one design, a bearing surface is positioned proximate each end of the shaft and is spaced apart from another bearing surface mounted on the rotor hub. A volume containing the lubricating fluid (a gap) is therefore formed between the bearing surfaces. The gap between the bearing surfaces must be repeatable from disk drive to disk drive in the manufacturing process.

The conventional technique for setting a gap in a bearing comprises mounting a lower bearing component onto a shaft after the shaft has been secured to a support. A rotor hub having a central journal sleeve and a bearing surface affixed thereon is then mounted onto the shaft in a spaced apart relation to the lower bearing component, and an amount of hydrodynamic fluid is added into the rotor hub's journal sleeve. An upper bearing is then pressed onto the rotor shaft in a spaced apart relation to the rotor hub to complete the assembly.

One problem with this conventional technique, however, is that it compresses the shaft between the bearing surfaces, enlarging the shaft diameter and causing additional stiction between the shaft and the bearing surfaces. The problem is further complicated when the shaft is compressed to an enlarged diameter that is greater than the actual gap that must be set; consequently the hydrodynamic bearing cannot be properly formed.

Therefore, there is a need in the art for a method that can accurately and repeatably set these gaps while allowing for rapid motor assembly.

SUMMARY OF THE INVENTION

The invention provides a method and apparatus for assembling a hydrodynamic bearing of a disk drive spindle motor. This invention provides for the pulling of the shaft by applying an axial force to its free end while installing the bearing components, rather than compressing the shaft between the components. This elongates the free end of the shaft and eliminates compression in the shaft during motor assembly. Additionally, the invention may be useful for setting gaps in the hydrodynamic bearings of other types of motors. The invention can be used for installing conical type hydrodynamic bearings and flat/thrust plate bearings.

BRIEF DESCRIPTION OF THE DRAWINGS

The teachings of the invention can be readily understood by considering the following detailed description in conjunction with the accompanying drawings, in which:

FIGS. 3A–3F are a series of sectional motor assembly views of a sequence of steps to set bearing gaps in an electric motor according to one embodiment of the present invention.

To facilitate understanding, identical reference numerals have been used, where possible, to designate identical elements that are common to the figures.

DETAILED DESCRIPTION

Figure 1:
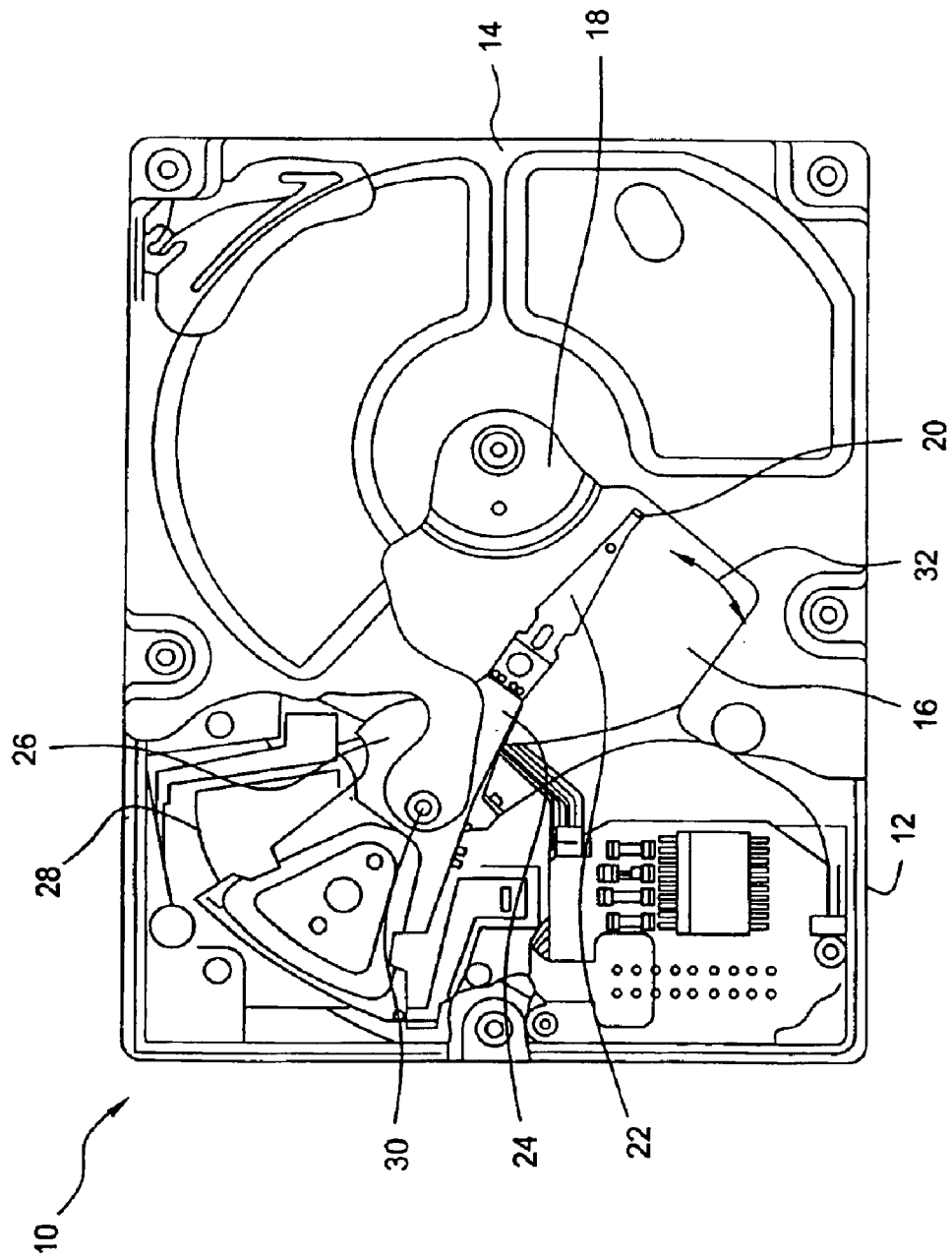
FIG. 1 is a top plan view of a disk drive.

The invention comprises a method for setting bearing gaps for hydrodynamic bearings in an electric motor. FIG. 1 is a plan view of a typical disk drive 10 wherein the invention is used. The disk drive 10 comprises a housing base 12 and a top cover 14. The housing base 12 is combined with the top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disk drive housing. For example, disk drives have been manufactured using a vertical split between two housing members. In such drives, that portion of the housing half that connects to the lower end of the spindle motor is analogous to the base 12, while the opposite side of the same housing member, that is connected to or adjacent the top of the spindle motor, is functionally the same as the top cover 14.

The disk drive 10 further comprises a disk pack 16 that is mounted for rotation on a spindle motor (not shown) by a disk clamp 18. The disk pack 16 includes one or more of individual disks that are mounted for co-rotation about a central axis. Each disk surface has an associated head 20 for communicating with the disk surface. In the example shown in FIG. 1, heads 20 are supported by flexures 22 that are in turn attached to head mounting arms 24 of an actuator body 26. The actuator body 26 shown in FIG. 1 is of the type known as a rotary moving coil actuator and includes a voice coil motor (VCM), shown generally at 28. The voice coil motor 28 rotates the actuator body 26 with its attached heads 20 about a pivot shaft 30 to position the heads 20 over a desired data track along an arcuate path 32. While a rotary actuator is illustratively shown in FIG. 1, the invention is also useful in disk drives having other types of actuators, such as linear actuators.

Figure 2:
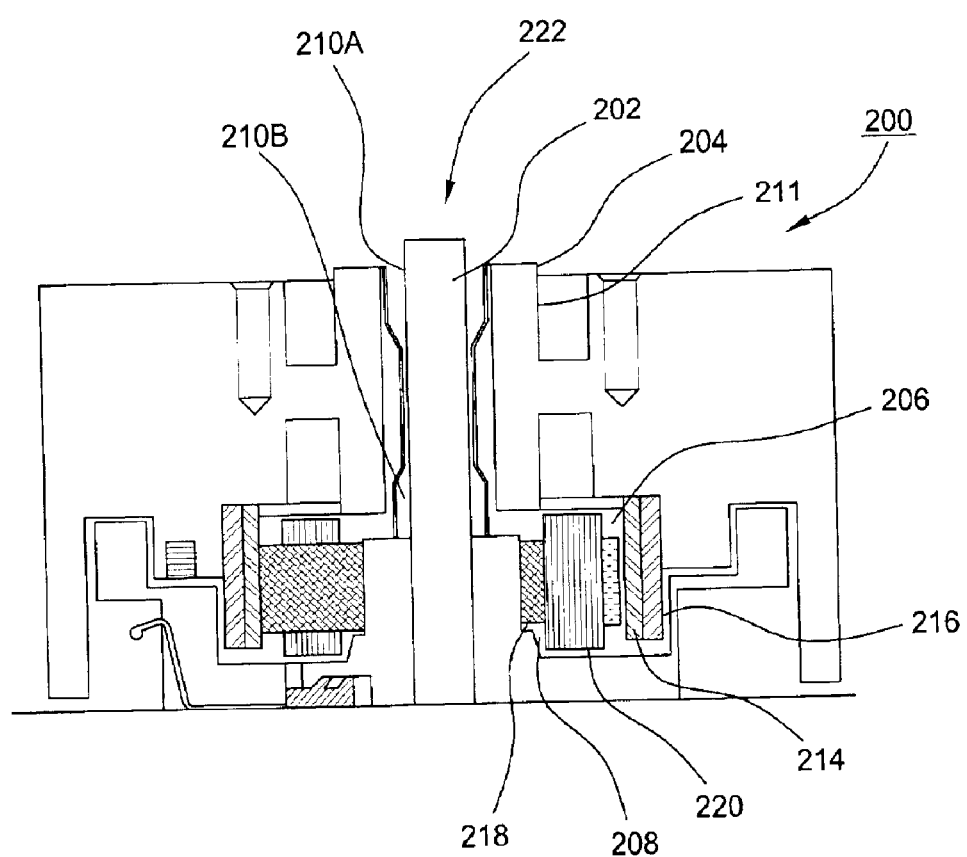
FIG. 2 is a sectional view of an isolated hydrodynamic bearing spindle motor.

FIG. 2 is a sectional view of a hydrodynamic bearing spindle motor 200. The spindle motor 200 includes a stationary shaft 202, a hub 204 and a stator 206. The shaft 202 is disposed through a base 208. The shaft 202 includes an inlet conduit 224 with outlet ports 226A and 226B that branch off and exit the shaft 202 at a point on the length of the shaft 202 that is between the bearing components 210A and 210B. The hub 204 is supported by the shaft 202 through bearing components 210A, 210B and 211 for rotation about the shaft 202. The bearing components 210A, 210B and 211 comprise, for example, a hydrodynamic bearing.

The bearing (comprising components 210A, 210B and 211) depicted in FIG. 2 is a conical type hydrodynamic bearing as contrasted to the "flat plate" or "thrust" design; the present invention may be used in conjunction with either bearing design. Specifically, bearing components 210A and 210B are "male" bearing components that are spaced apart from a "female" bearing component 211 by a gap 222.

The hub 204 includes a plurality of permanent magnets 214 attached to a first inner surface 216 of the hub 204, with the hub 204 and the magnets 214 operating as a rotor for the spindle motor 200.

The stator 206 is generally formed of a stack of stator laminations 218 that form a plurality of stator "teeth" that are each wound with an associated stator winding 220. The stator 206 is generally retained in the base 208 by fasteners, adhesives or other conventional methods.

In accordance with the invention, the hub 204 is initially assembled without any air gaps between the female bearing component 211 and the male bearing component 210A and 210B. The inventive method described below sets the air gap between the bearing components.

Figure 3C:
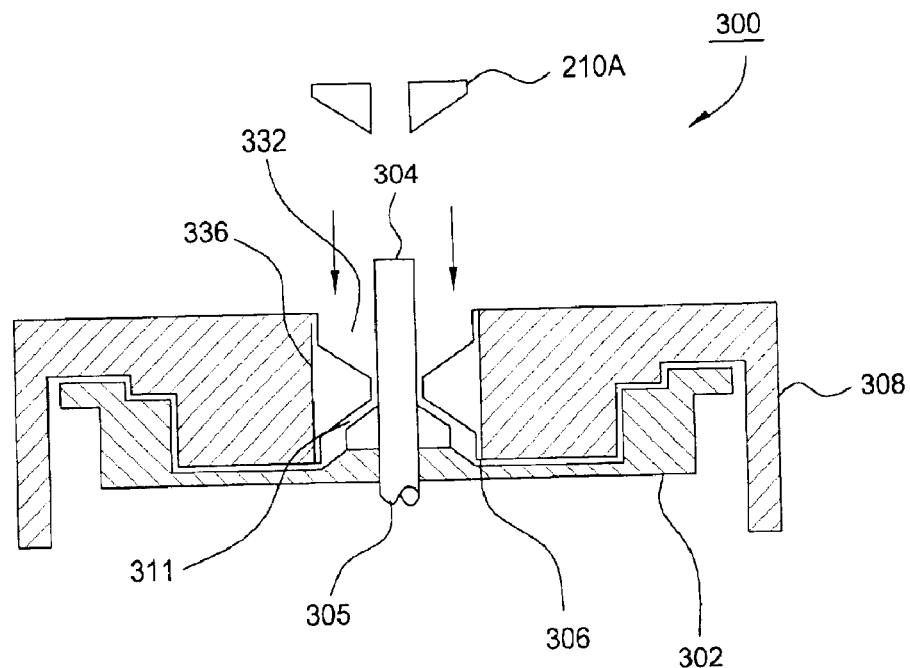
Figure 3D:
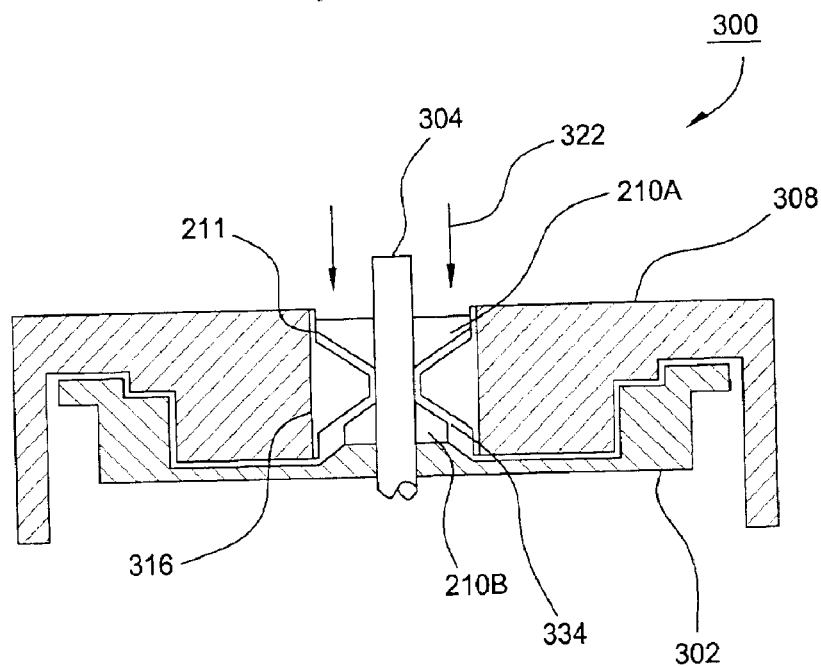
Figure 3E:
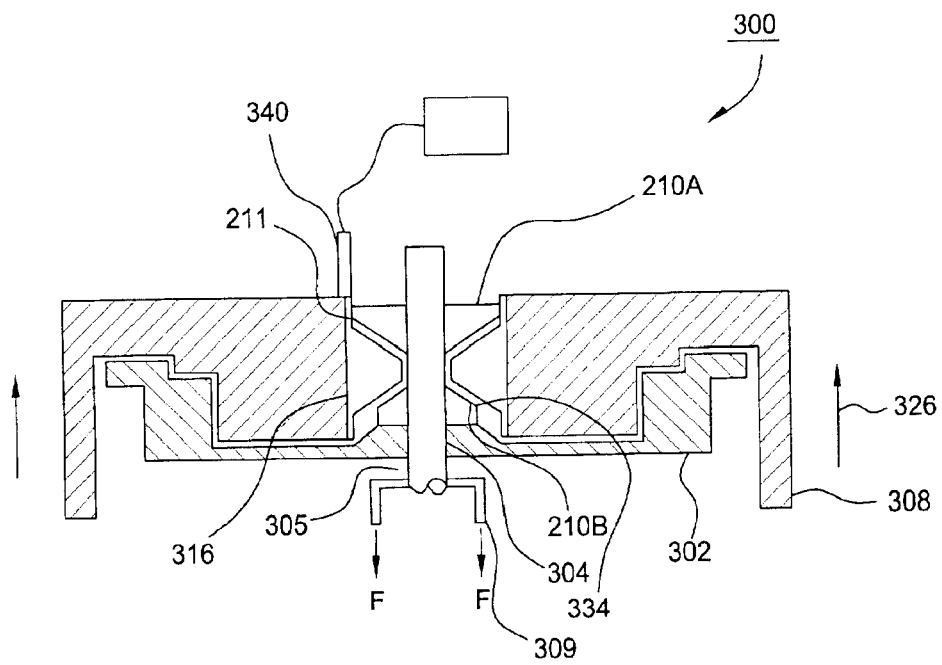
Figure 3F:
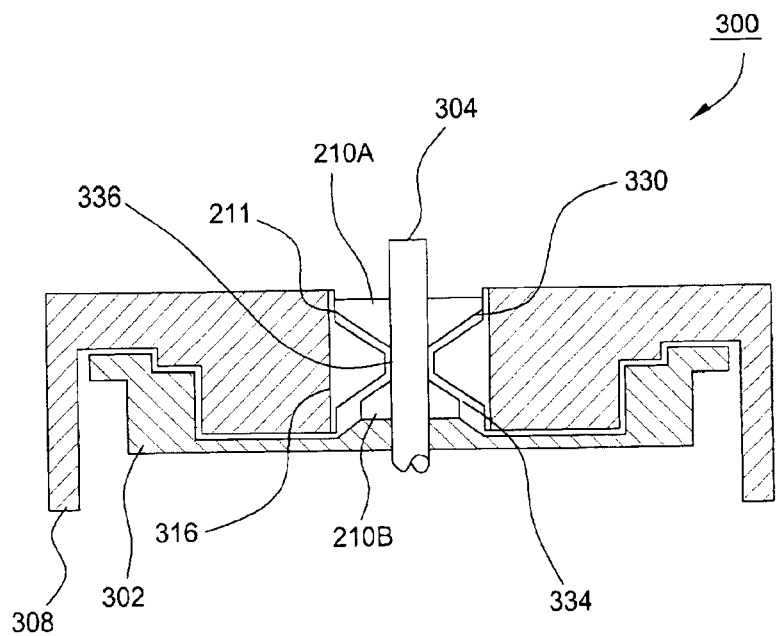
Figure 4:
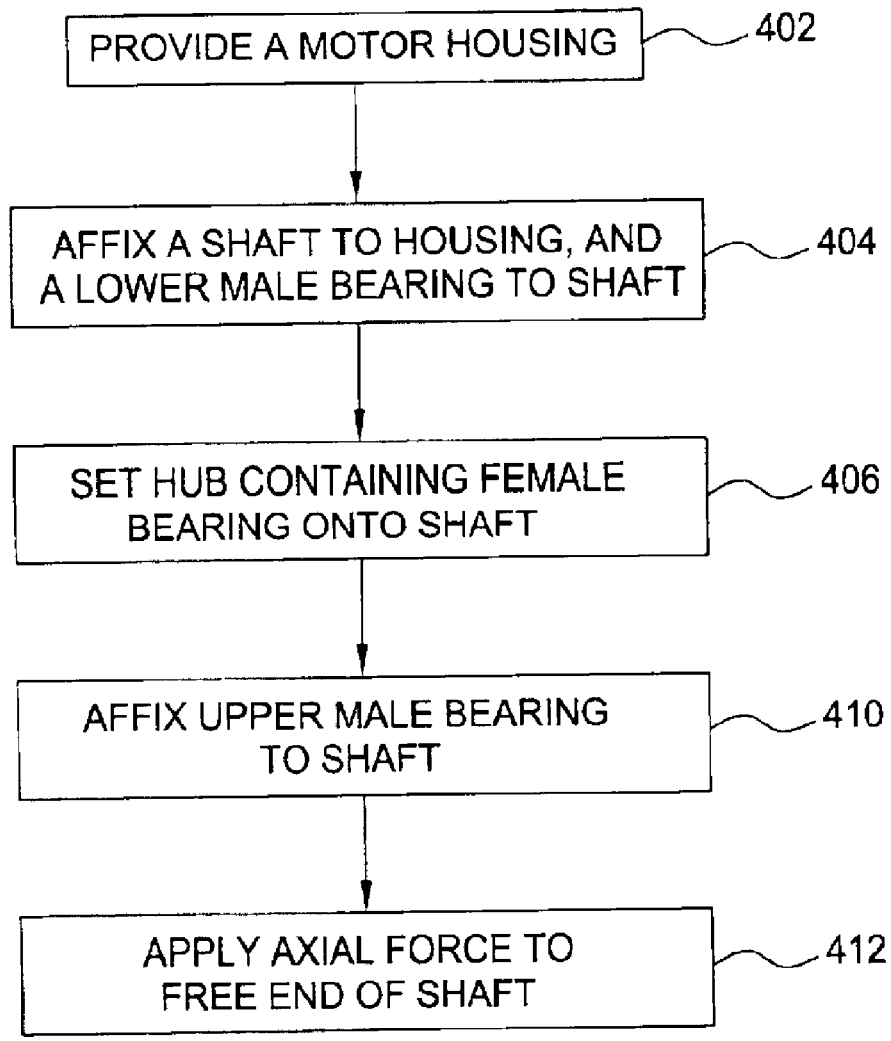
FIG. 4 is a flow diagram of a method for setting bearing gaps in an electric motor according to one embodiment of the present invention.

The reader may find it useful to simultaneously refer to FIGS. 3A–F and 4. FIGS. 3A–3F are a series of schematic, sectional views of the assembly process according to one embodiment of the present invention. FIGS. 3A–F illustrate a "static" technique for setting a bearing gap; however it should be appreciated that the inventive approach described may be used in "dynamic" setting techniques as well to yield additional and alternative benefits. This series has been simplified in order to emphasize the unique features of the present invention. The series as such depicts only the necessary elements needed to fully describe the present invention. FIG. 4 is a flow diagram representing a method 400 of motor assembly and setting of gaps in the hydrodynamic bearings of an electric motor according to one embodiment of the present invention.

The first step in the method for setting gaps in hydrodynamic bearings begins with FIG. 3A. The assembly process 400 begins by providing a motor housing in step 402.

FIG. 3A depicts a rotor hub support housing 302. Those skilled in the art will appreciate that a rotor hub support housing 302 may comprise a range of elements from the essential components necessary to support a rotor hub to the entire assembly surrounding the entire motor. FIG. 3A depicts the rotor hub support housing 302 in communication with elements of a shaft 304 and a lower "male" conical bearing component 210B. Typically, a shaft 304 is mounted or affixed, at step 402, to a rotor hub support housing 302 by conventional methods such as press fitting or use of fasteners, epoxy, etc., while a lower male bearing component 210B is generally press-fit into place, although other arrangements may be used. A free end 305 of the shaft 304 extends beyond the bottom surface of the rotor hub support 302.

FIG. 3B depicts the motor at step 406, in which the rotor hub 308 is set into the motor housing 302. The rotor hub 308 is fixedly attached, for example by press fitting, to a "female" conical bearing component 211 that is disposed on the surface 313 of the rotor hub 308. The rotor hub 308 is aligned coaxially with the center of the shaft 304 and rests such that a small volume of air (gap) 311 remains in between the female bearing component 211 and lower male bearing component 210B. The angled face 314 of the lower male bearing component 210B is roughly parallel to the angled face 315 of female bearing component 211, while the body of the lower male bearing component 210B is coaxially aligned with the central axis of the shaft 304. The journal sleeve 312 of the rotor hub 308 is spaced from the shaft 304 and acts as a fluid transmission conduit as well as an axial bearing surface.

The upper male bearing component 210A is installed at step 410 (see FIG. 3D). The upper male bearing component 210A is aligned coaxial with the shaft 304 and press fit (arrows 322) into an upper recess 332 defined in the top of the rotor hub 308. Little or no gap is left between the female bearing component 211 at top of the rotor hub 308 and the upper male bearing component 210A, however, a gap 334 does exist between the female bearing component 211 and the lower male bearing component 210B. The gap 334 may be set or adjusted by conventional methods such as tooling, etc., and is set within the range of 0.003 mm to 0.02 mm.

FIG. 3E depicts the final step in the gap setting method, step 412. A capacitance probe 340 is coupled to the assembly to monitor the distance between the female bearing component 211 and the upper male bearing component 210A. An axial force F is applied to the free end 305 (i.e. the end that extends through the bottom of the support housing 302) of the shaft 304 in a direction away from the support housing 302, essentially pulling the free end 305 of the shaft 304 downward. This is accomplished by securing a pulling means 309 to the free end 305 of the shaft 304 and applying force F. The pulling means 309 may be, for example, a clamp, though it should be appreciated that any sort of device capable of securedly grasping the free end 305 may be used. The value of the force F that is applied to the free end 305 of the shaft 304 is, for example, in the range of 50 to 250 lbs. Simultaneously, lower male bearing component 210B is held stationary to allow the shaft to be stretched.

As the axial force F is applied to the free end 305 of the shaft 304, the rotor hub 308 slides downward on the shaft 304, narrowing the gap 334 between the female bearing component 211 and the lower male bearing component 210B. Simultaneously, a gap (330 in FIG. 3F) is formed between the female bearing component 211 and the upper male bearing component 210A as the rotor hub 308 moves away from the upper male bearing component 210A. The capacitance probe 340 is used to monitor the progress of the gap 330 until it is properly set. FIG. 3F illustrates the resulting bearing gaps 330 and 334: bearing gap 330 is formed between the upper male bearing component 210A and the female bearing component 211, while bearing gap 334 is formed between the lower male bearing component 210B and the female bearing component 211.

Step 412 is essential to avoid compression (and resulting increase in diameter) or tension of the shaft 304 in the region between male bearing components 210A and 210B when the gap is set. Pulling on the shaft 304 serves to elongate the free end 305 and make the shaft 304 "neck down" or decrease in diameter, which also reduces stiction between the shaft 304 and the bearing surfaces.

Once balanced, there are three translational axis of freedom. Two of the axis' absolute motion are constrained by the journal gap size 336, while the axial absolute movement is constrained by the bearing gaps 330 and 334 as seen in FIG. 3F. The ends of the shaft 304 are resolved, for example, by mounting or screwing them into the base and top cover of the disk drive (shown in FIG. 1), but may be disposed of otherwise in assembling the drive.

Alternatively, the same concept of applying an axial force F to a free end 305 of the shaft 304 may be used in dynamic gap setting techniques (i.e. rotation of the hub). For example, the rotor hub 308 may be rotated to build pressure within the journal aperture 336, creating an air gap between the female bearing component 211 and the upper male bearing component 210A. An additional benefit of using such a method here is that it allows the female bearing component 211 to be moved axially while the gap is being set. This is real-time feedback of the actual gap, which allows the gap to be measured, for example by a capacitance probe, while it is being set.

Although various embodiments which incorporate the teachings of the present invention have been shown and described in detail herein, those skilled in the art can readily devise many other varied embodiments that still incorporate these teachings.

What is claimed is:

1. A method of assembling a hydrodynamic bearing, comprising:
    (a) affixing a first hydrodynamic bearing component upon a shaft;
    (b) positioning a second hydrodynamic bearing component in a spaced apart relation to said first hydrodynamic bearing component;
    (c) affixing a third hydrodynamic bearing component on the shaft, wherein the first, second, and thrid hydrodynamic bearing components are coaxially aligned with the shaft; and
    (d) applying an axial tension force to the shaft to set a fluid gap for at least one of the first, second, or third hydrodynamic bearing component.

2. The method according to claim 1, wherein the step of affixing the first hydrodynamic bearing component upon the shaft comprises aligning the first bearing component coaxial to the shaft while press fitting the first bearing component onto the shaft.

3. The method according to claim 1, wherein the step of positioning the second hydrodynamic bearing component relative to the first hydrodynamic bearing component comprises affixing the second hydrodynamic bearing component upon a rotor hub.

4. The method according to claim 3, wherein the rotor hub is mounted coaxially upon the shaft and rotates about the shaft.

5. The method according to claim 1, wherein the step of affixing the third hydrodynamic bearing component upon the shaft comprises aligning the third bearing component coaxial to the shaft while press-fitting the third bearing component into a contacting coplanar alignment on the second hydrodynamic bearing component.

6. The method according to claim 5, further comprising monitoring the distance between the second hydrodynamic bearing component and the third hydrodynamic bearing component.

7. The method according to claim 6, wherein the step of monitoring the distance between the second hydrodynamic bearing component and the third hydrodynamic bearing component comprises measuring said distance with a capacitance probe.

8. the method according to claim 6, wherein the distance between the second hydrodynamic bearing component and the third hydrodynamic bearing component increases as the axial tension force is applied to the shaft.

9. The method according to claim 1, wherein a free end of the shaft extends beyond a bottom surface of the first hydrodynamic bearing component.

10. The method according to claim 9, wherein the step of applying an axial tension force to the shaft is applied at the free end of the shaft.

11. The method according to claim 10, wherein the step of applying an axial tension force to the shaft further comprises holding the first hydrodynamic bearing component stationary.

12. The method according to claim 11, wherein the step of applying an axial tension force to the free end of the shaft comprises:
    (a) attaching a pulling means to the free end of the shaft; and
    (b) pulling the pulling means to apply force to the shaft.

13. The method according to claim 4, wherein the rotor hub is rotated to build pressure in the gap.

14. Apparatus for assembling a hydrodynamic bearing, comprising:
    means for affixing a first hydrodynamic bearing component upon a shaft;
    means for positioning a second hydrodynamic bearing component in a spaced apart relation to said first hydrodynamic bearing component;
    means for affixing a third hydrodynamic bearing component on the shaft, wherein the first, second, and thrid hydrodynamic bearing components are coaxially aligned with the shaft; and
    means for applying an axial tension force to the shaft to set a fluid gap for at least one of the first, second, or third hydrodynamic bearing component.

15. The apparatus of claim 14 wherein the means for applying the axial tension force is about 50 to 250 pounds.

16. The apparatus of claim 14 wherein the means for applying the axial tension force comprises a clamp that is affixed to an end of the shaft.

* * * * *